United States Patent
Bauer et al.

(10) Patent No.: US 6,350,814 B1
(45) Date of Patent: Feb. 26, 2002

(54) POLYMER MIXTURE WITH GOOD WORKABILITY

(75) Inventors: Peter Bauer, Ludwigshafen; Martin Lux, Dannstadt-Schauernheim; Dieter Lilge, Limburgerhof; Uwe Faller, Frankenthal, all of (DE)

(73) Assignee: Basell Polyolefine GmbH, Kehl (DE)

( * ) Notice: Subject to any disclaimer, the term of this patent is extended or adjusted under 35 U.S.C. 154(b) by 0 days.

(21) Appl. No.: 09/529,188

(22) PCT Filed: Sep. 18, 1998

(86) PCT No.: PCT/EP98/05942

§ 371 Date: Apr. 10, 2000

§ 102(e) Date: Apr. 10, 2000

(87) PCT Pub. No.: WO99/19400

PCT Pub. Date: Apr. 22, 1999

(30) Foreign Application Priority Data

Oct. 11, 1997 (DE) .......................... 197 45 047

(51) Int. Cl.[7] .............. C08F 8/00; C08L 23/00; C08L 23/04; C08L 27/12
(52) U.S. Cl. .................. 525/191; 525/199; 525/240
(58) Field of Search ................ 525/191, 199, 525/240

(56) References Cited

U.S. PATENT DOCUMENTS

| | | | |
|---|---|---|---|
| 2,825,721 A | 3/1958 | Hogan | |
| 3,125,547 A | 3/1964 | Blatz | |
| 4,794,096 A | 12/1988 | Ewen | |
| 5,371,260 A | 12/1994 | Sangokoya | |
| 5,391,793 A | 2/1995 | Marks | |
| 5,747,594 A * | 5/1998 | deGroot et al. | 525/240 |
| 6,187,424 B1 * | 2/2001 | Kjellqvist et al. | 428/220 |

FOREIGN PATENT DOCUMENTS

| | | |
|---|---|---|
| EP | 284 708 | 10/1988 |
| EP | 621 279 | 10/1994 |
| EP | 633 264 | 1/1995 |
| EP | 662 989 | 7/1995 |
| WO | 90/03414 | 4/1990 |
| WO | 91/09882 | 7/1991 |
| WO | 94/06857 | 3/1994 |
| WO | 95/27005 | 10/1995 |

OTHER PUBLICATIONS

J. Org. Chem., vol. 368, 1989, 359–370.
BASF OZ 0050/42761—U.S. Ser. No. 07/960,824.

* cited by examiner

Primary Examiner—Nathan M. Nutter
(74) Attorney, Agent, or Firm—Keil & Weinkauf

(57) ABSTRACT

A polymer mixture comprises at least 40 but less than 85% by weight of an ethylene copolymer (A) which has a density of from 0.91 to 0.93 g/cm$^3$, an HLMFR (190° C./21.6 kg) of from 5 to 60 g/10 min and a molar mass distribution $M_w/M_n \leq 3$, and more than 15 but at most 60% by weight of an ethylene copolymer (B) which has a density of from 0.93 to 0.945 g/cm$^3$, an HLMFR (190° C./21.6 kg) of from 8 to 20 g/10 min and a molar mass distribution $M_w/M_n \geq 7$, where the percentages by weight are in each case based on the total mass of the components (A) and (B).

8 Claims, No Drawings

POLYMER MIXTURE WITH GOOD WORKABILITY

The present invention relates to a polymer mixture comprising at least 40 but less than 85% by weight of an ethylene copolymer (A) which has a density of from 0.91 to 0.93 g/cm$^3$, an HLMFR (190° C./21.6 kg) of from 5 to 60 g/10 min and a molar mass distribution $M_w/M_n \leq 3$, and more than 15 but at most 60% by weight of an ethylene copolymer (B) which is different from ethylene copolymer (A) and has a density of from 0.93 to 0.945 g/cm$^3$, an HLMFR (190° C./21.6 kg) of from 8 to 20 g/10 min and a molar mass distribution $M_w/M_n$ 24 7, where the percentages by weight are in each case based on the total mass of the components (A) is and (B).

The invention further relates to the use of this polymer mixture for producing films, a process for producing films in which such a polymer mixture is used and also the films which have been produced from such a polymer mixture.

Ethylene copolymers having a narrow molar mass distribution, as can be obtained, for example, by means of metallocene catalysis, have particularly advantageous mechanical properties. However, their processability is in many cases unsatisfactory. Numerous attempts have therefore been made in the past to improve the processability without seriously impairing the mechanical properties.

LDPE as is obtained by free-radical high pressure polymerization displays a behavior which is in many ways complementary to that of these ethylene copolymers: LDPE can be very readily processed, but displays poorer mechanical properties. For this reason, experiments have been carried out on mixing ethylene copolymers prepared by means of metallocene catalysis with LDPE. Such polymer mixtures are described, for example, in WO 95/27005.

EP-B-0 662 989 likewise describes blends of metallocene copolymers with LDPE and also other ethylene copolymers. The metallocene-LLDPE component has a density of less than 0.92 g/cm$^3$. As second component, mention is made not only of LDPE but also of LLDPE and VLDPE. This second component has to have a melting point which is at least 10° C. higher than that of the metallocene component and an orientation temperature which is at least 2° C. below its melting point. The molar mass distribution of the second component is not subject to any particular requirements.

WO 90/03414 describes mixtures of various ethylene copolymers where the components of the mixture have either the same molar mass and different comonomer contents or the same comonomer content and different molar masses or comonomer contents which increase with the molar mass. However, all constituents of the mixture have a narrow molar mass distribution $M_w/M_n$ of $\leq 3$.

In terms of the combination of good mechanical properties and good processability, the known ethylene copolymer mixtures still leave something to be desired.

It is an object of the present invention to provide polymer mixtures based on ethylene copolymers which combine good is mechanical properties with good processability and are, in particular, suitable for the production of films.

We have found that this object is achieved by the polymer mixtures described at the outset, their use for producing films, a process for producing films in which such a polymer mixtures is used and also films which are produced from such a polymer mixture.

For the purposes of the present invention, the expression "HLMFR" means, as is customary, "high load melt flow rate" and is always determined at 190° C. under a load of 21.6 kg (190° C./21.6 kg).

The polymer mixtures of the present invention comprise as essential components the ethylene copolymers (A) and (B).

The ethylene copolymer (A) to be used according to the present invention has a density in the range from 0.91 to 0.93 g/cm$^3$, preferably from 0.915 to 0.925 g/cm$^3$, and a molar mass distribution $M_w/M_n \leq 3$. Its HLMFR is in the range from 5 to 60 g/10 min, preferably from 10 to 40 g/10 min.

Comonomers which may be present in copolymerized form in addition to ethylene in the copolymer (A), either individually or in admixture with one another, are all α-olefins having from 3 to 8 carbon atoms, for example propene, butene, pentene, hexene, 4-methylpentene, heptene and octene. Copolymer (A) preferably comprises pentene, hexene, 4-methylpentene or octene in copolymerized form as comonomer unit. Particular preference is given to hexene. The comonomers are generally present in copolymerized form in the ethylene copolymer (A) in amounts of from 1 to 20% by weight, preferably from 2 to 15% by weight and in particular from 1 to 8% by weight, in each case based on the ethylene copolymer (A). The same applies for the comonomers which are present in copolymerized form in copolymer (B).

In the polymer mixture of the present invention, the ethylene copolymer (A) makes up at least 40% by weight but less than 85% by weight, preferably from 50 to 80% by weight, of the total mass of the ethylene copolymers (A) and (B).

The ethylene copolymers (A) can in principle be prepared using any catalyst or catalyst system which leads to products having the required narrow mass distribution. In general, these catalysts are single-site catalysts, for example metallocene catalysts, catalysts having azaallyl or β-diketiminate ligands or catalysts based on Pd or Ni and having substituted diazabutadiene ligands.

Preference is given to polymer mixtures in which the ethylene copolymer (A) present is an ethylene-α-olefin copolymer prepared by means of metallocene catalysis.

The polymerization can here be carried out, for example, in the gas phase, in suspension, in solution or in the high pressure process, where the catalyst system used in a suspension or gas-phase process is preferably one which comprises a) an inorganic or organic support, b) a metallocene complex and c) a compound capable of forming metallocenium ions.

Support materials a) used are preferably finely divided supports which preferably have a particle diameter in the range from 1 to 300 μm, in particular from 30 to 70 μm. Suitable inorganic supports are, for example, magnesium chloride or silica gels, preferably those of the formula $SiO_2 \cdot aAl_2O_3$, where a is in the range from 0 to 2, preferably from 0 to 0.5; these are thus aluminosilicates or silicon dioxide. Such products are commercially available, eg. Silica Gel 332 from Grace. Suitable organic supports are, for example, finely divided polyolefins, eg. finely divided polypropylene.

The amount of support a) is preferably from 50 to 99.9% by weight, based on the total mass of support a) and metallocene complex (component b)).

Particularly suitable metallocene complexes b) are those of the formula I

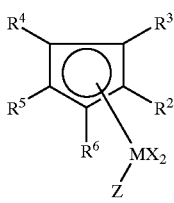

where the substituents have the following meanings:
M is titanium, zirconium, hafnium, vanadium, niobium or tantalum, in particular zirconium,
X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^7$ or —$NR^7R^8$, where
$R^7$ and $R^8$ can be identical or different and are, independently of one another, $C_1$–$C_{10}$-alkyl, $C_{16}$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical,
$R^2$ to $R^6$ are identical or different and are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a saturated or unsaturated cyclic group having from 4 to 15 carbon atoms, or $Si(R^9)_3$ where
$R^9$ is $C_1$–$C_{10}$-alkyl, $C_3$–$C_{10}$-cycloalkyl or $C_6$–$C_{15}$-aryl, Z is X or 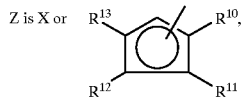

where the radicals
$R^{10}$ to $R^{14}$ are identical or different and are hydrogen, $C_1$–$C_{10}$-alkyl, 5- to 7-membered cycloalkyl which may in turn bear a $C_1$–$C_{10}$-alkyl as substituent, $C_6$–$C_{15}$-aryl or arylalkyl, where two adjacent radicals may also together form a saturated or unsaturated cyclic group having from 4 to 15 carbon atoms, or $Si(R^{15})_3$ where
$R^{15}$ is $C_1$–$C_{10}$-alkyl, $C_6$–$C_{15}$-aryl or $C_3$–$C_{10}$-cycloalkyl, or the radicals $R^5$ and Z together form a —$R^{16}$—$A^1$— group, where $R^{16}$ is 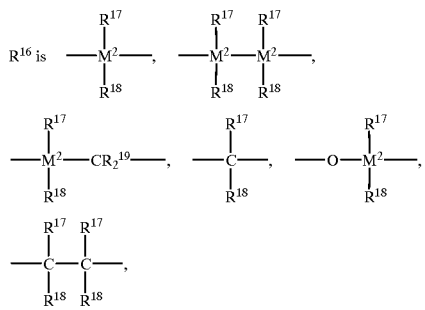

=$BR^{17}$, =$AlR^{17}$, —Ge—, —Sn—, —O—, —S—, —SO—, =$SO_2$, =$NR^{17}$, =CO, =$PR^{17}$ or =$P(O)R^{17}$, where
$R^{17}$, $R^{18}$ and $R^{19}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them form a ring, and
$M^2$ is silicon, germanium or tin,
$A^1$ is 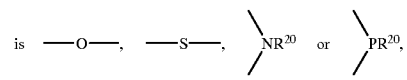

where
$R^{20}$ is $C_1$–$C_{10}$-alkyl, $C_6$–$C_{15}$-aryl, $C_3$–$C_{10}$-cycloalkyl, alkylaryl or $Si(R^{21})_3$,
$R^{21}$ is hydrogen, $C_1$–$C_{10}$-alkyl, $C_6$–$C_{15}$-aryl which may in turn bear $C_1$–$C_4$-alkyl groups as substituents or $C_3$–$C_{10}$-cycloalkyl
or the radicals $R^5$ and $R^{13}$ together form a —$R^{16}$— group.

Among the metallocene complexes b) of the formula I, preference is given to

Ia
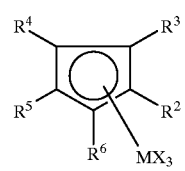

Ib
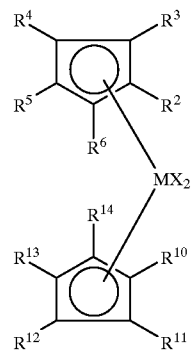

Ic
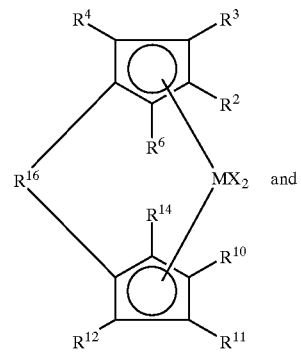

and

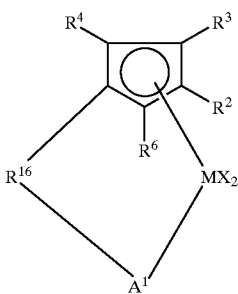

Particular preference is given to those transition metal complexes which contain two aromatic ring systems as ligands, ie. in particular the transition metal complexes of the formula Ib or Ic.

The radicals X can be identical or different; they are preferably identical.

Among the compounds of the formula Ia, particular preference is given to those in which M is titanium, zirconium or hafnium,
X is chlorine, $C_1$–C4-alkyl or phenyl and
$R^2$ to $R^6$ are hydrogen or $C_1$–$C_4$-alkyl.

Among the compounds of the formula Ib, preference is given to those in which

M is titanium, zirconium of hafnium,
X is chlorine, $C_1$–$C_4$-alkyl or phenyl,
$R^2$ to $R^6$ are hydrogen, $C_1$–$C_4$-alkyl or $Si(R^9)_3$,
$R^{10}$ to $R^{14}$ are hydrogen, $C_1$–$C_4$-alkyl or $Si(R^{15})_3$.

The compounds of the formula Ib in which the cyclopentadienyl radicals are identical are particularly useful.

Examples of particularly useful compounds of the formula Ib are:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride
and also the corresponding dimethylzirconium compounds.

Particularly useful compounds of the formula Ic are those in which $R^2$ and $R^{10}$ are identical and are hydrogen or $C_1$–$C_{10}$-alkyl,
$R^6$ and $R^{14}$ are identical and are hydrogen, methyl, ethyl, isopropyl or tert-butyl,
$R^3$, $R^4$, $R^{11}$ and $R^{12}$ have the meanings: $R^4$ and $R^{12}$ are $C_1$–$C_4$-alkyl $R^3$ and $R^{11}$ are hydrogen or two adjacent radicals $R^3$ and $R^4$ or $R^{11}$ and $R^{12}$ together form cyclic groups having from 4 to 12 carbon atoms,

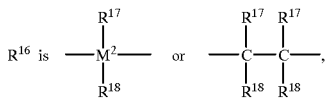

M is titanium, zirconium or hafnium and
X is chlorine, $C_1$–$C_4$-alkyl or phenyl.

Examples of particularly useful complexes of the formula Ic are:
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-methylbenzindenyl)zirconium dichloride
dimethylsilanediylbis(2-ethylbenzindenyl)zirconium dichloride,
methylphenylsilanediylbis(2-ethylbenzindenyl)zirconium dichloride,
methylphenylsilanediylbis(2-methylbenzindenyl)zirconium dichloride,
diphenylsilanediylbis(2-methylbenzindenyl)zirconium dichloride,
diphenylsilanediylbis(2-ethylbenzindenyl)zirconium dichloride,
and dimethylsilanediylbis(-2-methylindenyl)hafnium dichloride
and also the corresponding dimethylzirconium compounds.

Particularly useful compounds of the formula Id are those in which

M is titanium or zirconium,
X is chlorine, $C_1$–$C_4$-alkyl or phenyl,

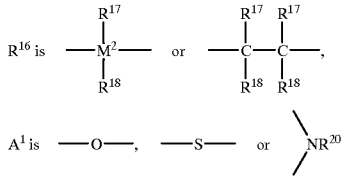

and
$R^2$ to $R^4$ and $R^6$ are hydrogen, $C_1$–$C_{10}$-alkyl, $C_3$–$C_{10}$-cycloalkyl, $C_6$–$C_{15}$-aryl or $Si(R^9)_3$, or two adjacent radicals together form a cyclic group having from 4 to 12 carbon atoms.

The synthesis of such complexes can be carried out by methods known per se, with preference being given to reacting the appropriately substituted, cyclic hydrocarbon anions with halides of titanium, zirconium, hafnium, vanadium, niobium or tantalum.

Examples of appropriate preparative methods are described for example, in Journal of Organometallic Chemistry, 369 (1989), 359–370.

It is also possible to use mixtures of various metallocene complexes b).

Suitable compounds c) capable of forming metallocenium ions are strong, uncharged Lewis acids, ionic compounds containing Lewis acid cations and ionic compounds containing Brönsted acids as cation.

As strong, uncharged Lewis acids, preference is given to compounds of the formula II

$$M^3X^1X^2X^3 \qquad \text{II}$$

where $M^3$ is an element of main group III. of the Periodic Table, in particular B, Al or Ga, preferably B, $X^1$, $X^2$ and $X^3$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical, or fluorine, chlorine, bromine or iodine, in particular haloaryls, preferably pentafluorophenyls.

Particular preference is given to compounds of the formula II in which $X^1$, $X^2$ and $X^3$ are identical, preferably tris(pentafluorophenyl)borane.

Suitable ionic compounds containing Lewis acid cations are compounds of the formula III $$[(Y^{a+})Q_1Q_2\ldots Q_z]^{d+} \qquad \text{III}$$

where

Y is an element of main groups I. to VI. or transition groups I. to VIII. of the Periodic Table, $Q_1$ to $Q_z$ are singly negatively charged groups such as $C_1$–$C_{28}$-alkyl, $C_6$–$C_{15}$-aryl, alkylaryl, arylalkyl, haloalkyl, haloaryl each having from 6 to 20 carbon atoms in the aryl part and from 1 to 28 carbon atoms in the alkyl part, $C_3$–$C_{10}$-cycloalkyl which may bear $C_1$–$C_{10}$-alkyl groups as substituents, halogen, $C_1$–$C_{28}$-alkoxy, $C_6$–$C_{15}$-aryloxy, silyl or mercaptyl groups, a is an integer from 1 to 6, z is integer from 0 to 5 and d is the difference a–z, but d is greater than or equal to 1.

Particularly useful Lewis acid cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are also mentioned in WO 91/09882, preferably tetrakis(pentafluorophenyl)borate.

Ionic compounds containing Brönsted acids as cations and preferably likewise noncoordinating counterions are mentioned in WO 91/09882; the preferred cation is N,N-dimethylanilinium.

Particularly useful compounds c) capable of forming metallocenium ions are open-chain or cyclic aluminoxane compounds of the formula IV or V

IV

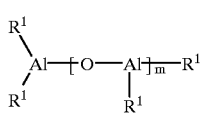

-continued

V

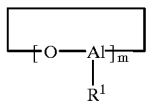

where $R^1$ is $C_1$–$C_4$-alkyl, preferably methyl or ethyl, and m is an integer from 5 to 30, preferably from 10 to 25.

The preparation of these oligomeric aluminoxane compounds is usually carried out by reacting a solution of trialkylaluminum with water and is described, for example, in EP-A 284 708 and U.S. Pat. No. 4,794,096.

In general, the oligomeric aluminoxane compounds obtained in this way are in the form of mixtures of both linear and cyclic chain molecules of various lengths, so that m is to be regarded as a mean value. The aluminoxane compounds can also be present in admixture with other metal alkyls, preferably aluminum alkyls.

As compounds c) capable of forming metallocenium ions it is also possible to use aryloxyaluminoxanes as described in U.S. Pat. No. 5,391,793, aminoaluminoxanes as described in U.S. Pat. No. 5,371,260, aminoaluminoxane hydrochlorides as described in EP-A 633 264, siloxyaluminoxanes as described in EP-A 621 279 or mixtures thereof.

The ethylene copolymer (B) present in the polymer mixtures of the present invention has a broader molar mass distribution than does the ethylene copolymer (A); the copolymer (B) has an $M_w/M_n$ of $\geq 7$. The density of the ethylene copolymer (B) is in the range from 0.93 to 0.945 g/cm³, preferably from 0.932 to 0.940 g/cm³. The HLMFR of this component is in the range from 8 to 20 g/10 min, preferably from 10 to 15 g/10 min.

What has been said for the comonomers of the ethylene copolymer (A) also applies to the comonomers which can be present in copolymerized form in addition to ethylene in the ethylene copolymer (B) to be used according to the present invention, both in respect of the type of comonomers and also in respect of the amount in which these are present in copolymerized form in the copolymer.

In the polymer mixtures of the present invention, the ethylene copolymer (B) makes up more than 15% by weight but at most 60% by weight, preferably from 20 to 50% by weight, of the total mass of the ethylene copolymers (A) and (B).

The ethylene copolymers (B) can be prepared using various catalysts. Furthermore, various polymerization processes, eg. gas-phase, solution or suspension processes, are suitable for preparing the ethylene copolymers (B). The ethylene copolymers (B) are also preferably prepared in suspension or gas-phase polymerization processes, in particular in the fluidized-bed process. Suitable catalyst systems are, in particular, Ziegler or Phillips catalyst systems as are generally known to those skilled in the art.

According to the present invention, preference is given to polymer mixtures in which the ethylene copolymer (B) present is an ethylene-α-olefin copolymer prepared using a supported chromium catalyst. Such catalyst systems are described, for example, in U.S. Pat. No. 2,825,721, EP-B-589350 and EP-B-537590.

The polymer mixtures of the present invention which consist essentially of the ethylene copolymers (A) and (B) preferably have a molar mass distribution $M_w/M_n$ of from 3 to 7.

Particular preference is given to those polymer mixtures which additionally have a molar mass distribution $M_z/M_w$ whose value is equal to or greater than $(M_w/M_n) \times 1.1$. In general, this value $M_z/M_w$ is from 3.5 to 8.

Apart from the ethylene copolymers (A) and (B), the polymer mixtures of the present invention can further comprise auxiliaries and/or additives known per se, for example processing stabilizers, stabilizers against light and heat, customary film additives such as lubricants, antiblocking agents and antistatics, and also, if desired, colorants. Those skilled in the art are familiar with the type and amount of these additives.

Furthermore, it has been found that mixing in small amounts of fluoroelastomers can further improve the processing properties of the polymer mixtures of the present invention. Such fluoroelastomers are known as such as processing aids and are commercially available, eg. under the trade names Viton® and Dynamar® (see also, for example, U.S. Pat. No. 3,125,547). They are preferably added in amounts of from 10 to 1000 ppm, particularly preferably from 20 to 200 ppm, based on the total mass of the polymer mixture of the present invention.

The preparation of the polymer mixtures of the present invention can be carried out by generally known methods. This can be done, for example, by feeding the components as powders into a granulator, eg. a twin-screw kneader or a Farrel kneader. Furthermore, a granule mixture can also be processed directly on a film production unit.

The polymer mixtures of the present invention are very suitable for producing films on blown film and cast film units at high outputs. The films made from the polymer mixtures of the present invention have very good mechanical properties, high shock resistance and high tear resistance together with good optical properties. They are particularly suitable for the packaging sector and for high-strength heavy sack packaging and also for the food sector. Furthermore, the films have only a low blocking tendency and will therefore also run through machines without use of lubricants and antiblocking additives, or using only small amounts of these.

The following examples illustrate the invention.

EXAMPLES

Granule mixtures were prepared from the following ethylene copolymers (A) and (B):

Ethylene copolymer (A)

The ethylene-hexene copolymer was prepared using a metallocene catalyst in a suspension polymerization process in a loop reactor and had the following properties:

| | |
|---|---|
| MFR (190° C./2,16 kg): | 1.7 g/10 min |
| HLMFR (190° C./21,6 kg): | 26 g/10 min |
| Density: | 0.917 g/cm³ |
| Hexene content: | 5.5% by weight |
| $M_w$: | 116,000 g/mol |
| $M_n$: | 47,000 g/mol |
| $M_w/M_n$: | 2.5 |

Ethylene copolymer (B)

The ethylene-hexene copolymer (B) was prepared using a supported chromium catalyst in a gas-phase fluidized-bed polymerization process and had the following properties:

| | |
|---|---|
| HLMFR (190° C./21,6 kg): | 13 g/10 min |
| Density: | 0.938 g/cm³ |
| Hexene content: | 2.5% by weight |
| $M_w$: | 233,000 g/mol |

-continued

| | |
|---|---|
| $M_n$: | 23,000 g/mol |
| $M_w/M_n$: | 10.0 |

The ethylene copolymers (A) and (B) each contained 1500 ppm of the processing stabilizer Irganox® B 215 (manufacturer: Ciba Geigy) and 50 ppm of the fluoroelastomer Dynamar® FX 9613 (manufacturer: Dyneon) and were fed as mixtures in the weight ratios shown in Table 1 to a blown film processing machine. The blown film unit (Windmöller & Hölscher) had a screw diameter of 60 mm, a barrier screw, a die diameter of 225 mm and a die gap width of 1 mm. The blowing ratio was 1:2.5. The granule mixtures were processed into films having a thickness of 40 μm.

The molar mass distributions and the derived mean values $M_n$, $M_w$ and $M_z$ were determined by means of high-temperature gel permeation chromatography in accordance with DIN 55672.

TABLE 1

Production conditions and properties of films made of the polymer mixtures of the present invention

| Weight ratio A/B | 100/0 (not according to the present invention) | 80/20 | 70/30 | 60/40 | 50/50 |
|---|---|---|---|---|---|
| HLMFR [g/10 min] | 26.0 | 21.6 | 21.1 | 19.2 | 18.4 |
| MFR [g/10 min] | 1.7 | 1.0 | 0.84 | 0.66 | 0.55 |
| Density [g/cm³] | 0.917 | 0.921 | 0.923 | 0.925 | 0.927 |
| Output [kg/h] | 50)* | 120)** | 120)** | 120)** | 120)** |
| Polymer pressure [bar] | 200 | 245 | 250 | 277 | 295 |
| Polymer temperature [° C.] | 218 | 228 | 231 | 234 | 236 |
| Dart drop [g] ASTM D 1709 | >1200 | 390 | 305 | 220 | 200 |
| Shear modulus [N/mm²] ISO 6721/2 | 180 | 255 | 295 | 325 | 340 |
| Haze [%] ASTM D 1003 | 3 | 8 | 11 | 20 | 25 |
| Blocking force [N] DIN 53366 | >150 | 32 | 11 | 8 | 8 |
| $M_n$ | 47,000 | 38,000 | 35,000 | 32,000 | 30,000 |
| $M_w$ | 116,000 | 134,000 | 142,000 | 151,000 | 160,000 |
| $M_z$ | 227,000 | 652,000 | 826,000 | 981,000 | 1,120,000 |
| $M_z/M_w$ | 1.95 | 4.87 | 5.79 | 6.48 | 6.98 |
| $M_w/M_n$ | 2.48 | 3.49 | 4.05 | 4.67 | 5.32 |

)*Bubble was unstable at higher output
)**Bubble was stable, maximum output of the extruder The experiments demonstrate the advantageous properties of the polymer mixtures of the present invention: the mixtures can be processed into films very well and indeed at a significantly better output than is the case for pure metallocene copolymer. The resulting films display an excellent combination of mechanical and optical properties.

We claim:

1. A polymer mixture comprising at least 40 but less than 85% by weight of an ethylene copolymer (A) which has a density of from 0.91 to 0.93 g/cm³, an HLMFR (190° C./21.6 kg) of from 5 to 60 g/10 min and a molar mass distribution $M_w/M_n \leq 3$, and more than 15 but at most 60% by weight of an ethylene copolymer (B) which has a density of from 0.93 to 0.945 g/cm³, an HLMFR (190° C./21.6 kg)

of from 8 to 20 g/10 min and a molar mass distribution $M_w/M_n \geq 7$, where the percentages by weight are in each case based on the total mass of the components (A) and (B).

2. A polymer mixture as claimed in claim 1 having a molar mass distribution $M_w/M_n$ of from 3 to 7.

3. A polymer mixture as claimed in claim 1 having a molar mass distribution $M_z/M_w$ whose value is equal to or greater than $(M_w/M_n) \times 1.1$.

4. A polymer mixture as claimed in claim 1 in which the copolymer present in the ethylene copolymer (A) and/or in the ethylene copolymer (B) is hexene.

5. A polymer mixture as claimed in claim 1 in which the ethylene copolymer (A) present is an ethylene-α-olefin copolymer prepared by means of metallocene catalysis.

6. A polymer mixture as claimed in claim 1 in which the ethylene copolymer (B) present is an ethylene-α-olefin copolymer prepared using a supported chromium catalyst.

7. A polymer mixture as claimed in claim 1 which further comprises a fluoroelastomer in addition to the ethylene copolymers (A) and (B).

8. A film produced from a polymer mixture as claimed in claim 1.

* * * * *